United States Patent [19]

Takahashi et al.

[11] Patent Number: 5,437,926
[45] Date of Patent: Aug. 1, 1995

[54] MOLDED ARTICLES HAVING HARD COAT LAYER

[75] Inventors: Nobukazu Takahashi, Yokohama; Teiji Kohara, Kawasaki; Tadao Natsuume, Yokosuka, all of Japan

[73] Assignee: Nippon Zeon Co., Ltd., Tokyo, Japan

[21] Appl. No.: 915,389

[22] Filed: Jul. 20, 1992

Related U.S. Application Data

[63] Continuation of Ser. No. 615,837, Nov. 19, 1990, abandoned.

[30] Foreign Application Priority Data

Nov. 20, 1989 [JP] Japan ................. 1-301233

[51] Int. Cl.$^6$ ........................................ B32B 27/30
[52] U.S. Cl. ........................ 428/337; 428/336; 428/517; 428/520; 428/521; 428/522
[58] Field of Search ............... 428/217, 336, 517, 520, 428/521, 522, 332

[56] References Cited

U.S. PATENT DOCUMENTS 4,608,409  8/1986  Coady et al. ............... 524/199
4,614,778  9/1986  Kajiura et al. .............. 526/281

FOREIGN PATENT DOCUMENTS 0317262  5/1989  European Pat. Off. .

OTHER PUBLICATIONS

Standard Methods for Measuring Adhesion of Tape Test, ASTM Designation: D3359–83.
English translation of Japanese Kokai Patent Sho 53 (1978) 102933 Coating Method of Norbornene Polymer Moldings Murakoshi et al.

*Primary Examiner*—D. S. Nakarani
*Attorney, Agent, or Firm*—Armstrong, Westerman, Hattori, McLeland & Naughton

[57] ABSTRACT

A process for the production of a molded or formed article provided with a hard coat layer, which comprises coating a surface of a thermoplastic saturated norbornene polymer molded or formed article with a UV curable hard coating layer containing a solvent of an aromatic hydrocarbon series and/or solvent of an alicyclic hydrocarbon series, drying the resultant coating, and irradiating the dried coating with UV ray, and a molded or formed article provided with a hard coat layer having high hardness and excellent bond strength.

10 Claims, No Drawings

MOLDED ARTICLES HAVING HARD COAT LAYER

This application is a continuation of application Ser. No. 615,837 filed Nov. 19, 1990, now abandoned.

BACKGROUND OF THE INVENTION

1. Field of the Invention

This invention relates to a molded or formed article of a thermoplastic saturated norbornene polymer provided with a hard coat large having excellent adhesion and bond strength and high hardness, and to a process for the production of said molded or formed article. A molded or formed article produced by the process of this invention is particularly suitable as an optical material.

2. Related Art

It is conventinal practice to use polycarbonate (PC) and polymethyl methacrylate (PMMA) mainly as an optical transparent plastic molding material, e.g. for an optical disk substrate and a plastic lens. Since, however, PC has high birefringence, and since PMMA has high water absorption, it is increasingly difficult to meet with advancing technological requirements.

In recent years, a thermoplastic saturated norbornene polymer such as a hydrogenation product of a polymer formed by ring opening polymerization of a norbornene monomer or an adduct type polymer of a norbornene monomer with ethylene has attracted attention as an optical plastic molding material for an optical disk, and the like (JP-A-60-26024, JP-A-1-24826, JP-A-63-31752, EP 303,246, EP 317,262, U.S. Pat. No. 4,614,778, JP-A-61-120816). The thermoplastic saturated norbornene polymer is a very useful material for optical use due to its low birefringence and excellent transparency, heat resistance, water absorption resistance, etc. Further, since said polymer is also excellent in strength, water resistance, electric insulation, solvent resistance and resistance to chemicals such as acids and alkalis, it is also useful as an electrically insulating material and a humidity-resistant packing material such as a container and a film in addition to the optical use.

However, a molded or formed article produced from said material has a problem in that a hard coat layer peels off from the molded or formed article after being cured due to poor wettability with a general-purpose hard coating agent and inadequate adhesion. And, there has not been known any molded or formed article of a thermoplastic saturated norbornene polymer which is provided with a hard coat layer having a bond strength, measured by a crosscut adhesion test, of not less than 90% and a surface hardness, measured by a pencil hardness test, of not less than 2H, nor has there been known any process for the production thereof.

In general, a plastic molded or formed article is sometimes required to have a high surface hardness depending upon use. For example, optical disks such as a compact disk and a laser disk come in direct contact with the hands of its user when used, and therefore, when its surface is flawed due to contact with other substance, an error takes place in reading a stored memory content. In addition, in the optical use and the field of a packing container, the flaw on the molded article surface is undesirable since the transparency is degraded. In order to avoid such a flaw, the surface of a molded or formed article is generally required to have a pencil hardness of not less than 3H. A molded article produced from a thermoplastic saturated norbornene polymer usually has a surface hardness of about H, and such a molded article is required to be improved to some extent.

For these reasons, the molded or formed article surface is sometimes modified by forming a hard coat layer on the surface. Further, the hard coat layer formed on a transparent plastic molded or formed article can maintain the transparency and fine appearance of plastic, and can impart the molded or formed article with excellent resistance to chemicals and contaminants. Therefore, the formation of such a hard coat layer leads to a widening of the application range of the plastic, and it is possible to develop a versatile use of a molded article as a substitute for glass and as an automobile part, an electric and electronic part, a construction material, a furniture material, and the like.

Such a hard coat layer is required to bond strongly to a substrate, and is usually tested by a crosscut adhesion test, in which the hard coat layer is cut lengthwise and widthwise eleven times each with a sharp-edged cutter at intervals of 1 mm to form 100 squares which individually have an area of 1 mm×1 mm, and a certain adhesive tape is firmly pressed thereon and speedily peeled off at right angles. The bond strength by this test is evaluated by counting the number of squares which are not peeled off. A molded article is required to have, in general, a bond strength of not less than 90%, particularly preferably of 100%.

Meanwhile, the general-purpose hard coating agents can be generally classified into a silicone-based hard coating agent and an organic hard coating agent.

This silicone-based hard coating agent is a partial hydrolysis product of a silane compound, and requires curing treatment under heat at a relatively high temperature of 120° C. for about one hour. As a result, a plastic substrate is thermally deformed slightly. Therefore, the silicone-based hard coating agent is not suitable for a plastic molded or formed article of which accuracy is required.

On the other hand, the organic hard coating agent is grouped into a type in which a melamine, alkyd, urethane or acrylic coating composition is cured under heat and the other type in which a polyfunctional acrylic coating composition is cured under UV irradiation. The former type is easy in handling. Its defect is, however, that it is inferior in hardness and weatherability. The latter is excellent in hardness and productivity, and causes little thermal influence on a resin due to UV curing. Therefore, a UV curable polyfunctional acylic hard coating agent is suitable as a hard coating agent for a transparent plastic molded article.

The UV curable polyfunctional acrylic hard coating agent is usually a product which contains a polyfunctional acrylic monomer and/or oligomer, a photopolymerization initiator and other additive, and which is with or without a solvent (thinner) as a diluent.

In PC and PMMA which are general-purpose transparent plastic materials, alcohol solvents such as isopropyl alcohol, glycol ether solvents such as ethylene glycol monomethyl ether, ester solvents such as ethyl acetate and butyl acetate and ketone solvents such as acetone and methyl ethyl ketone are used as a thinner for a UV curable hard coating agent.

However, even if the UV curable hard coating agent using the above thinner is applied to a molded or formed article formed of the thermoplastic saturated norbornene polymer, the resultant hard coat layer is easily peeled off since it has poor adhesion with the molded or formed article after being cured. The reason therefor is as follows: The thermoplastic saturated norbornene polymer is one of the olefin resins and the surface of a molded or formed article thereof has poor wettability and high chemical resistance. Therefore, neither of the polymer and the hard coating agent is mutually diffused into another's phase through the interface thereof, and molecular entanglement hardly occurs. As described above, the thermoplastic saturated norbornene polymer is one of the materials which are as difficult to bond or treat with a chemical as olefin resins such as polyethylene and polypropylene are.

Therefore, there have not been known any thermoplastic saturated norbornene polymer molded articles provided with a hard coat layer having excellent adhesion and high surface hardness and an effective process for the production thereof.

SUMMARY OF THE INVENTION

It is an object of this invention to provide a thermoplastic saturated norbornene polymer molded article provided with a hard coat layer having excellent adhesion and high surface hardness and a process for the production thereof.

The present inventors have made a diligent study to overcome the above problems and found that the use of a UV curable hard coating agent containing a solvent (thinner) of aromatic hydrocarbon series and/or a solvent of alicyclic hydrocarbon series makes it possible to form a hard coat layer having greatly improved adhesion strength to a surface of the thermoplastic saturated norbornene polymer molded article.

This invention is based on the above finding.

According to this invention, therefore, there is provided for a first time a thermoplastic saturated norbornene polymer molded article provided with a hard coat layer having a bond strength, measured by a crosscut adhesion test, of not less than 90% and a surface hardness, measured by a pencil hardness test, of not less than 3H. Further, according to this invention, there is provided a process for the production of a molded article provided with a hard coat layer, which comprises coating a surface of a thermoplastic saturated norbornene polymer molded article with a UV curable hard coating agent containing a solvent of aromatic hydrocarbon series and/or a solvent of alicyclic hydrocarbon series, drying the resultant coating, and irradiating the dried coating with a UV ray, and there is also provided a molded or formed article produced by said process.

DETAILED DESCRIPTION OF PREFERRED EMBODIMENTS

This invention will be explained in detail hereinafter.

Thermoplastic Saturated Norbornene Polymer

The molded or formed material intended for use in this invention is a thermoplastic saturated norbornene polymer, and the specific example thereof is a polymer having a structural unit of the following general formula [I] and/or a structural unit of the following general formula [II].

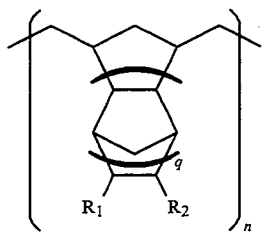

General formula [I]

wherein $R_1$ and $R_2$ are independently hydrogen, a hydrocarbon moiety, or a polar group such as halogen, ester, nitrile or pyridyl, or $R_1$ and $R_2$ may together form a ring, n is a positive integer, and q is zero or a positive integer.

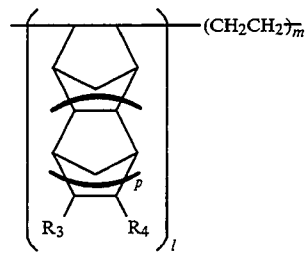

General formula [II]

wherein $R_3$ and $R_4$ are independently hydrogen, a hydrocarbon moiety or a polar group such as halogen, ester, nitrile or pyridyl, or $R_3$ and $R_4$ may together form a ring, l and m are positive integers, and p is zero or a positive integer. Preferably, both p and q are 3 or less; and l, m and n are usually 50–5000 (as the average), respectively and l and m satisfy the following equation:

$$0.1 \leq \frac{l}{l + m} \leq 0.9.$$

The polymer having the structural unit of the general formula [I] is a saturated polymer produced by polymerizing the following monomer according to a known ring opening polymerization method, and hydrogenating the resultant polymer according to a usual hydrogenation method. Examples of the monomer are norbornene and alkyl and/or alkylidene-substituted products thereof such as 5-methyl-2-norbornene, 5,6-dimethyl-2-norbornene, 5-ethyl-2-norbornene, 5-butyl-2-norbornene, and 5-ethylidene-2-norbornene; dicyclopentadiene and 2,3-dihydrodicyclopentadiene, alkyl-substituted, e.g. methyl, ethyl, propyl, or butyl-substituted products thereof and a polar group-substituted, e.g. halogen-substituted, products thereof; dimethanooctahydronaphthalene, and alkyl and/or alkylidene-substituted products thereof and a polar group-substituted, e.g. halogen substituted, products thereof such as 6-methyl-1,4:5,8-dimethano-1,4,4a,5,6,7,8,8a-octahydronaphthalene,6-ethyl-1,4:5,8-dimethano-1,4,4a,5,6,7,8,8a-octahydronaphthalene, 6-ethylidene-1,4:5,8-dimethano- 1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; trimers and tetramers of cyclopentadiene such as 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,-11a-dodecahydro-1H-cyclopentaanthracene; and the like.

The polymer having the structural unit of the general formula [II] comprises a polymer produced by subjecting the above norbornene monomer and ethylene to addition polymerization according to a known method and/or a hydrogenation product thereof, and these polymers and hydrogenation products are saturated polymers.

The above polymer preferably has a number average molecular weight, measured by GPC (gel permeation chromatography) using cyclohexane as a solvent, of 10,000 to 200,000. And, when residual unsaturated bonds in the molecular chain of the polymer are saturated by a hydrogenation reaction, the hydrogenation ratio is preferably not less than 90% in view of resistance to deterioration by light and deterioration by weather.

Further, the thermoplastic saturated norbornene polymer may be a copolymer prepared by copolymerizing another monomer component such as an α-olefin, a cycloolefin, etc., when the polymer having the structural unit of the general formula [I] and/or the general formula [II] is produced.

When the above polymer is used by blending it with other resin depending upon use, the process of this invention is effective.

Further, the process of this invention is also effective for a molded or formed article produced from a polymer obtained by incorporating other fillers such as an antistatic agent, an antioxidant and a glass fiber, and additives such as a dye and a pigment into the thermoplastic saturated norbornene polymer.

No special limitation is imposed on the method for forming a molded or formed article of the thermoplastic saturated norbornene polymer of this invention. Examples of the molded article are products produced by injection molding such as an optical disk and lens, products produced by melt-extrusion such as a tube and a rod, products produced by melt-extruding the polymer and taking up the extrudate with a roll such as a sheet and a film, a sheet-like product produced by a hot press, a film produced by casting a solvent solution and an oriented film produced by orientation.

UV Curable Hard Coating Agent

The UV curable hard coating agent contains, as essential components, a reactive monomer and/or a reactive oligomer and a photopolymerization initiator.

Examples of the reactive monomer are mainly acrylates. Specific examples of the reactive monomer are monofunctional acrylate monomers such as 2-hydroxyethyl methacrylate, 2-hydroxypropyl methacrylate, 2-ethylhexyl methacrylate, phenoxyethyl acrylate, phenoxypropyl acrylate and other higher alkyl acrylates; other monofunctional monomers such as styrene and vinyl pyrrolidone; and polyfunctional acrylate monomers in which at least two acrylates are bonded to a polyol such as ethylene glycol, diethylene glycol, tripropylene glycol, butylene glycol, hexanediol, trimethylolpropane, tetramethylolpropane, or pentaerythritol; and the like.

Examples of the reactive oligomer are a polyester acrylate having a terminal acryloyl group, an epoxy acrylate or polyurethane acrylate having an epoxy group in the molecular chain and an acryloyl group in the terminal position, an unsaturated polyester having a double bond in the molecular chain, 1,2-polybutadiene, and other oligomers having an epoxy or vinyl ether group.

Examples of the photopolymerization initiator are acetophenones such as 2,2-dimethoxy-2-phenylacetophenone, 2,2-diethoxyacetophenone and chlorinated acetophenone; benzophenones; benzoins such as benzil, methylorthobenzoylbenzoate and benzoin alkyl ether; azo compounds as $\alpha,\alpha'$-azobisisobutyronitrile, 2,2'-azobispropane and hydrazone; organic peroxides such as benzoyl peroxide and di-tert-butyl peroxide; diphenyl disulfides such as diphenyl disulfide, dibenzyl disulfide and dibenzoyl disulfide; and the like.

In this invention, the reactive monomer and/or reactive oligomer and photopolymerization initiator are required to be diluted with a specific solvent (thinner) when used.

That is, the solvent is at least one member selected from aromatic or alicyclic hydrocarbons, specifically from aromatic hydrocarbons such as benzene, toluene, xylene, etc., and alicyclic hydrocarbons such as cyclohexane, methylcyclohexane and decalin, etc.

The amount of the solvent is usually 0.05 to 20 times, preferably 0.1 to 10 times, more preferably 0.15 to 5 times as large as the total amount of the reactive oligomer, reactive monomer, photopolymerization initiator and other additives. When the amount of the solvent is less than 0.05 times, such an amount is too small to obtain an effect on improvement in adhesion. When this amount is more than 20 times, the curing component concentration is too low to obtain a film having a thickness required to give sufficient surface hardness.

The intended hard coating agent may be prepared by individually preparing the reactive oligomer, reactive monomer, photopolymerization initiator and solvent and mixing them, or by diluting a commercially available, UV curable hard coating agent with the above solvent.

Further, a suitable thermoplastic polymer may be added to the hard coating agent in order to adjust the viscosity and improve the adhesion strength.

In general, polymers having a similar structure have good compatibility and wettability with each other. Therefore, when a thermoplastic polymer is added in order to improve the adhesion strength, it is effective to use a polymer having a similar structure to that of the polymer of the structural formula [I] or [II]. Specific examples of such a polymer are norbornene polymers of the formula [I] or [II], and petroleum resins of a dicyclopentadiene, diene, aliphatic, aromatic or water white type, or hydrogenation products thereof.

Further, various surfactants may be added in order to improve the surface properties such as antistatic properties and others. Preferred as a surfactant are those which are transparent and have good compatibility with the hard coating agent. And, specifically preferred is a nonionic surfactant, and an amine-type surfactant is particularly preferred.

In addition, a thermal polymerization inhibitor, a photopolymerization inhibitor, a tackifier, a filler, etc., may be further added as required.

HOW TO USE

The hard coating agent is coated on a molded or formed article produced from the thermoplastic saturated norbornene polymer, the solvent is dried, and the coating is irradiated with a UV ray, whereby a cured hard coat layer is formed.

The coating method is not specially limited, and the coating is carried out by any one of spray coating, dipping, immersing, spin coating and roll coating methods.

The coating after being dried preferably has a thickness of 2 to 300 μm. When the thickness is less than the above lower limit, it is not possible to obtain any sufficient effect on the improvement in surface hardness. When the thickness is more than the above upper limit, the produtivity is low since it takes too much time to dry the coating and carry out the curing reaction. Further, the hard coat layer sometimes has a lower strength than that which has a small thickness due to insufficient curing, and the hard coat layer sometimes cracks due to hardening to excess.

The coated surface is required to be dried fully. When the coating is cured while it contains a large amount of the solvent, a crack is liable to occur on the coating, and a coating having high hardness cannot be obtained because of the solvent. The drying temperature and time differ depending upon the solvent used, the amount of coating and the form of bonding surface. In general, the drying conditions may be set at a temperature of not higher than 120° C. for a time for sufficient drying in order to avoid thermal deformation. Specifically, the coating is dried at 60° to 120° C. for 3 to 60 minutes. When the coating is dried at a high temperature, it is desirable to bring the temperature of the dried coating near to room temperature by cooling it at room temperature for about 10 seconds to about 10 minutes.

Thereafter, the coating is irradiated with a UV ray from a light source which efficiently emits UV rays such as a high-pressure mercury lamp, etc., whereby the coating is cured for a short period of time and a hard coat layer having high hardness is formed. The UV radiation dose differs depending upon the reactivities of the reactive monomer, the reactive oligomer and the photopolymerization initiator. When a high-pressure mercury lamp having a power of 80 W/cm is used, the coating can be usually cured for a short period of time, e.g., for about 5 to about 10 seconds.

Accordingly, there is provided a molded article of this invention which is produced from a thermoplastic saturated norbornene polymer having the structural unit of the general formula [I] and/or the structural unit of the general formula [II] and provided with a 2 to 300 μm thick, hard coat layer having a surface hardness, measured by a hardness test according to JIS K-5400, of at least 3H and being free from peeling when measured by a crosscut adhesion test disclosed in the various handbooks such as, for example, KIYOMI KATO, Ultraviolet Ray Irradiation System (Shigaisen Koka System), Sogo Gijutsu Center (Total Technology Center), p. 365 (1989).

EXAMPLES

This invention will be more specifically explained hereinafter by reference to Examples, Referential Examples and Comparative Examples. However, this invention shall not be limited to the Examples.

Referential Example 1

A hydrogenation product of a polymer formed by ring-opening polymerization of 6-methyl-1,4:5,8-dimethano-1,4,4a,5,6,7,8,8a-octahydronaphthalene (MTD) (number average molecular weight=28,000, hydrogenation ratio of nearly 100%, glass transition temperature=152° C.) was injection-molded to form disks having a thickness of 2 mm and a diameter of 100 mm. One of the disks was measured for pencil hardness on its surface (JIS K-5400, a load of 1 kg) to show a hardness of 2H.

Referential Example 2

A hard coating agent was prepared by mixing 100 g of dipentaerythritol hexaacrylate as a reactive monomer, 3 g of a photopolymerization initiator (trade name: Irgacure 184, supplied by Ciba Geigy) and 40 g of toluene, and stirring the resultant mixture.

Example 1

All of the surface of one of the disks prepared in Referential Example 1 was coated with the hard coating agent prepared in Referential Example 2 by immersing the disk in the hard coating agent and slowly lifting it.

The disk coated with the hard coating agent was dried with a hot air dryer at a temperature of 100° C. for 10 minutes and then allowed to stand at 20° C. for 5 minutes. Thereafter, the disk was irradiated for 5 minutes with a UV ray from a high-pressure mercury lamp of 80 W/cm which was 10 cm distant from the disk, whereby the coating was cured.

The surface of the disk (molded article) having the resultant hard coat layer was measured for pencil hardness to show that the hardness thereof was improved to 5H. The hard coat layer was subjected to a crosscut adhesion test by crosscutting the surface thereof, applying a cellophane adhesive tape (trade name, Cellotape, supplied by Sekisui Chemical) thereto and detaching the cellophane adhesive tape to show no peeling of the hard coat layer and good adhesion (bond strength: 100%).

Referential Example 3

A hard coating agent was prepared by repeating Referential Example 2 except that 50 g of butyl acetate was used in place of the toluene.

Comparative Example 1

One of the disks prepared in Referential Example 1 was coated with the hard coating agent prepared in Referential Example 3 in the same way as in Example 1, and the other procedure of Example 1 was repeated to give a disk having a UV cured hard coat layer.

The hard coat layer was subjected to a crosscut adhesion test in the same way as in Example 1 to show a peeling of about 90% of the surface to which an adhesive tape was applied (bond strength: 10%).

Referential Example 4

A hydrogenation product of a copolymer formed by ring-opening polymerization of a mixed monomer of MTD and dicyclopentadiene (DCP) having a MTD/DCP molar ratio of 70/30 (number average molecular weight=27,000, hydrogenation ratio of nearly 100%, glass transition temperature=133° C.) was injection-molded to give disks similar to those obtained in Referential Example 1.

One of the resultant disks was measured for pencil hardness on its surface to show a hardness of 1H.

Referential Example 5

A hard coating agent was prepared by mixing 100 g of pentaerythritol triacrylate as a reactive monomer, 3 g of a photopolymerization initiator (trade name, Irgacure 184, supplied by Ciba Geigy), 50 g of a hydrogenated petroleum resin of dicyclopentadiene type (trade name, Escorez 5300, supplied by Tonex Co., Ltd.), 1 g of a surfactant (trade name, SA-300, supplied by Toho Chemical Industry) and 100 g of toluene, and stirring the resultant mixture.

Example 2

One of the disks prepared in Referential Example 4 was coated with the hard coating agent prepared in Referential Example 5 in the same way as in Example 1, and the other procedure of Example 1 was repeated to give a disk having a UV cured hard coat layer.

The surface of the above disk was measured for pencil hardness to show that the surface hardness was improved to 3H. Further, the disk was subjected to a crosscut adhesion test in the same way as in Example 1 to show no peeling of the hard coat layer (bond strength: 100%).

Referential Example 6

An addition copolymerization product of MTD and ethylene (ethylene content 60%, number average molecular weight 32,000, glass transition temperature 130° C.) was injection-molded to give disks similar to those prepared in Referential Example 1. The disks had a pencil hardness of 2H.

Example 3

One of the disks prepared in Referential Example 6 was coated with the hard coating agent prepared in Referential Example 2 in the same way as in Example 1, and the other procedure of Example 1 was repeated to give a disk having a UV cured hard coat layer.

The surface of the above disk was measured for pencil hardness to show that the surface hardness was improved to 5H. Further, the disk was subjected to a crosscut adhesion test in the same way as in Example 1 to show no peeling of the hard coat layer (bond strength: 100%).

Referential Example 7

A hard coating agent was prepared by mixing 100 g of a UV curable resin (trade name Unidec 17 806, supplied by Dainippon Ink & Chemicals, Inc.), 3 g of a photopolymerization initiator (trade name, Irgacure 184, supplied by Ciba Geigy), 30 g of cyclohexane and 100 g of toluene and stirring the resultant mixture.

Example 4

Example 1 was repeated except that one of the disks prepared in Referential Example 1 was spin-coated with the hard coating agent prepared in Referential Example 7, whereby a disk having a UV cured hard coat layer was obtained.

The surface of the above disk was measured for pencil hardness to show that the surface hardness was improved to 5H. Further, the disk was subjected to a crosscut adhesion test in the same way as in Example 1 to show no peeling of the hard coat layer (bond strength: 100%).

Referential Example 8

A hard coating agent was prepared by mixing 100 g of a UV curable resin (trade name, ART RESIN UN-3340, supplied by Negami Industry) and 3 g of a photopolymerization initiator (trade name, Irgacure 184, supplied by Ciba Geigy) and stirring the resultant mixture.

Comparative Example 2

Example 1 was repeated except that one of the disks prepared in Referential Example 1 was roll-coated with the hard coating agent prepared in Referential Example 8, whereby a disk having a UV cured hard coat layer was obtained.

The above disk was subjected to a crosscut adhesion test in the same way as in Example 1 to show a peeling of about 70% of the surface to which an adhesive tape was applied (bond strength: 30%).

Referential Example 9

A hard coating agent was prepared by repeating Referential Example 8 except that 100 g of toluene was added.

Example 5

Example 1 was repeated except that one of the disks prepared in Referential Example 1 was spin-coated with the hard coating agent prepared in Referential Example 9, whereby a disk having a UV cured hard coat layer was obtained.

The surface of the above disk was measured for pencil hardness to show that the surface hardness was improved to 5H. Further, the disk was subjected to a crosscut adhesion test in the same way as in Example 1 to show no peeling of the hard coat layer.

Referential Example 10

A hard coating agent was prepared by adding 20 g of toluene to 100 g of a commercially available hard coating agent (trade name, Gosellac UV-1164, supplied by Nippon Gosei Kagaku), and stirring the resultant mixture.

Example 6

Example 1 was repeated except that one of the disks prepared in Referential Example 1 was spin-coated with the hard coating agent prepared in Referential Example 10, whereby a disk having a UV cured hard coat layer.

The surface of the above disk was measured for pencil hardness to show that the surface hardness was improved to 5H. Further, the disk was subjected to a crosscut adhesion test in the same way as in Example 1 to show no peeling of the hard coat layer.

The above Examples and Comparative Examples clearly show that a thermoplastic saturated norbornene polymer molded or formed article provided with a hard coat layer having a bond strength, measured by a crosscut adhesion test, of not less than 90% and a surface hardness, measured by a pencil hardness test, of not less than 3H can be obtained for the first time, and it is also clear therefrom that a hard coat layer having good bond strength can be obtained by applying, as a hard coating agent, a UV curable hard coating agent containing a solvent of aromatic hydrocarbon series and/or a solvent of alicyclic hydrocarbon series to a molded article produced from a thermoplastic saturated norbornene polymer.

In addition, the above Examples used, as a substrate, disk-shaped test pieces produced by injection-molding a thermoplastic saturated norbornene polymer. Since, however, the degree of adhesion of a hard coat layer is determined depending upon material quality, it is clear that the forming method, the molded or formed article form and the material molecular weight impose no limitation on this invention.

This invention can provide a thermoplastic saturated norbornene polymer molded or formed article provided with an excellently bonded, hard coat layer having high hardness.

What is claimed is:

1. A thermoplastic saturated norbornene polymer molded or formed article comprising a polymer having at least one structural unit selected from the group consisting of general formula [I] and general formula [II];

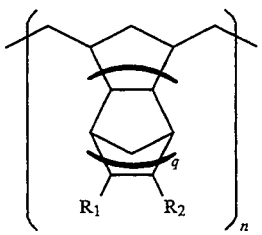

General formula [I]

wherein $R_1$ and $R_2$ are independently hydrogen, a hydrocarbon moiety, or a polar group, or $R_1$ and $R_2$ together form a ring, n is a positive integer, and q is zero or a positive integer;

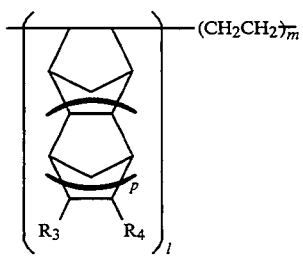

General formula [II]

where in $R_3$ and $R_4$ are independently hydrogen, a hydrocarbon moiety or a polar group, or $R_3$ and $R_4$ together form a ring, l and m are positive integers, and p is zero or a positive integer, and a 3 to 300 μm thick, hard coat layer having a surface hardness, measured by a hardness test according to JIS K-5400, of at least 3H and having a bond strength, when measured by a crosscut adhesion test, where not less than 90% of 100 squares formed during the test are not peeled off, said article prepared by forming a coating on a surface of the polymer with a UV curable hard coating agent containing (a) reactive monomer and/or reactive oligomer, (b) a photopolymerization initiator, and (c) a solvent consisting of an aromatic hydrocarbon, an alicyclic hydrocarbon, or mixtures thereof, drying the resultant coating, and irradiating the dried coating with UV rays.

2. An article according to claim 1, wherein the reactive monomer is a monofunctional or polyfunctional acrylate.

3. An article according to claim 2, wherein the polyfunctional acrylate is an acrylate of pentaerythritol.

4. An article according to claim 1, wherein the reactive oligomer is a polyester acrylate, an epoxy acrylate or a polyurethane acrylate.

5. An article of claim 1, wherein the coating agent is dried at 60° to 120° C. for 3 to 60 minutes.

6. An article of claim 1, wherein the polymer is a hydrogenation product of a polymer formed by ring-opening polymerization of a norbornene-containing monomer.

7. An article according to claim 6, wherein the hydrogenation ratio is not less than 90%.

8. An article of claim 1, wherein the polymer is an addition polymerization product of a norbornene-containing monomer and ethylene.

9. An article according to claim 8, wherein the norbornene-containing monomer is a monomer of hydrocarbon series.

10. A thermoplastic saturated norbornene polymer molded or formed article according to claim 1, wherein the polar group of $R_1$ $R_2$, $R_3$ and $R_4$ is selected from the group consisting of halogen, ester, nitrile and pyridyl.

* * * * *